Feb. 1, 1955

A. R. VOGEL 2,700,791

ANTIBACKLASH BOLT ASSEMBLY

Filed May 31, 1952

INVENTOR:-
ALVIN R. VOGEL

Herbert E. Metcalf
HIS PATENT ATTORNEY

INVENTOR:
ALVIN R. VOGEL

HIS PATENT ATTORNEY

Feb. 1, 1955 A. R. VOGEL 2,700,791
ANTIBACKLASH BOLT ASSEMBLY
Filed May 31, 1952 3 Sheets-Sheet 3

INVENTOR:-
ALVIN R. VOGEL

BY Herbert E. Metcalf
HIS PATENT ATTORNEY

United States Patent Office 2,700,791
Patented Feb. 1, 1955

2,700,791

ANTIBACKLASH BOLT ASSEMBLY

Alvin R. Vogel, Los Angeles, Calif., assignor to Northrop Aircraft, Inc., Hawthorne, Calif., a corporation of California Application May 31, 1952, Serial No. 290,970

8 Claims. (Cl. 16—140)

The present invention relates to anti-backlash devices and more particularly to an anti-backlash bolt or pin that is ideally suited for use in hinges for control surfaces on airplanes.

In modern high speed airplanes, such as for example fighter airplanes of the 600 M. P. H. or higher class, the problem of preventing control surface flutter at high speeds is a serious one, particularly in the mountings of the ailerons, and of the horizontal and vertical rudders in the tail assembly. The same problem is involved when these control surfaces are moved by full power controls such as hydraulic motors, as the surface in these systems is held in all positions by the motor, and any material backlash in the motor-surface connection provides a backlash source leading to the development of flutter in flight.

In airplanes having surfaces tending to flutter, various expedients have been proposed and used to reduce flutter. Aerodynamic balancing, static (weight) balancing of the surface, and even various damping devices known as "flutter dampers" have been installed adjacent the hinges of the surface. In many instances flutter has still occurred in spite of any or all such preventive measures.

During an intensive study of control surface flutter as it occurs in high speed airplanes, I have found that, due to normal manufacturing and servicing requirements, total backlash in control surface hinges of certain airplanes can be excessive, on the order of .50 degree. I have further found that even when balancing and damping is applied to the control surfaces with even that small amount of backlash in the hinges, flutter is still apt to occur. I also found that if substantially zero backlash can be built into the surface hinges, flutter will not occur when the surface is otherwise properly balanced, designed, and driven. Flutter dampers then become unnecessary.

It is an object of the present invention to provide a readily removable hinge bolt or pin that can be installed without hinge backlash.

It is another object of the present invention to provide a hinge bolt or pin ideally suitable for airplane control surface hinges.

It is still a further object of the invention to provide a simple anti-backlash bolt or pin.

Other objects and advantages of the invention will be apparent from perusal of the ensuing description of the drawings in which:

Figure 1 is a perspective view of a high speed fighter airplane (U. S. A. F. F-89).

Figure 1:
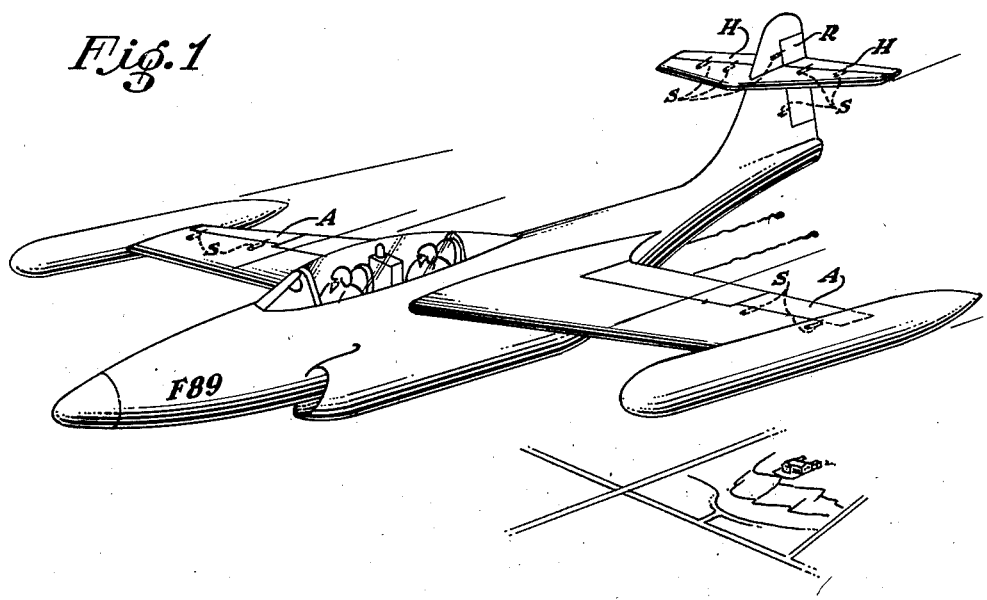

Referring first to Figure 1, the bolt or pin of the present invention is particularly suitable for use on the F-89 airplane in the hinges of the attitude controls which include the ailerons A; the horizontal rudder H; and the vertical rudder R. In the airplane shown, all of these surfaces are fully power-driven by the use of hydraulic motors under the control of the pilot, without surface load feedback, as more particularly shown, described and claimed in the Feeney application Serial No. 23,567, filed April 27, 1948, now abandoned. The type of hydraulic motor used is of the cylinder-piston type and is so arranged and energized that the surface is stabilized in all positions by neutral fluid leakage providing for example, from 1,000 to 1,500 p. s. i. pressure to each side of the piston through a very short servo loop, as best shown in Figure 2, which shows typical aileron hinge, motor, and control connections.

Figure 2:
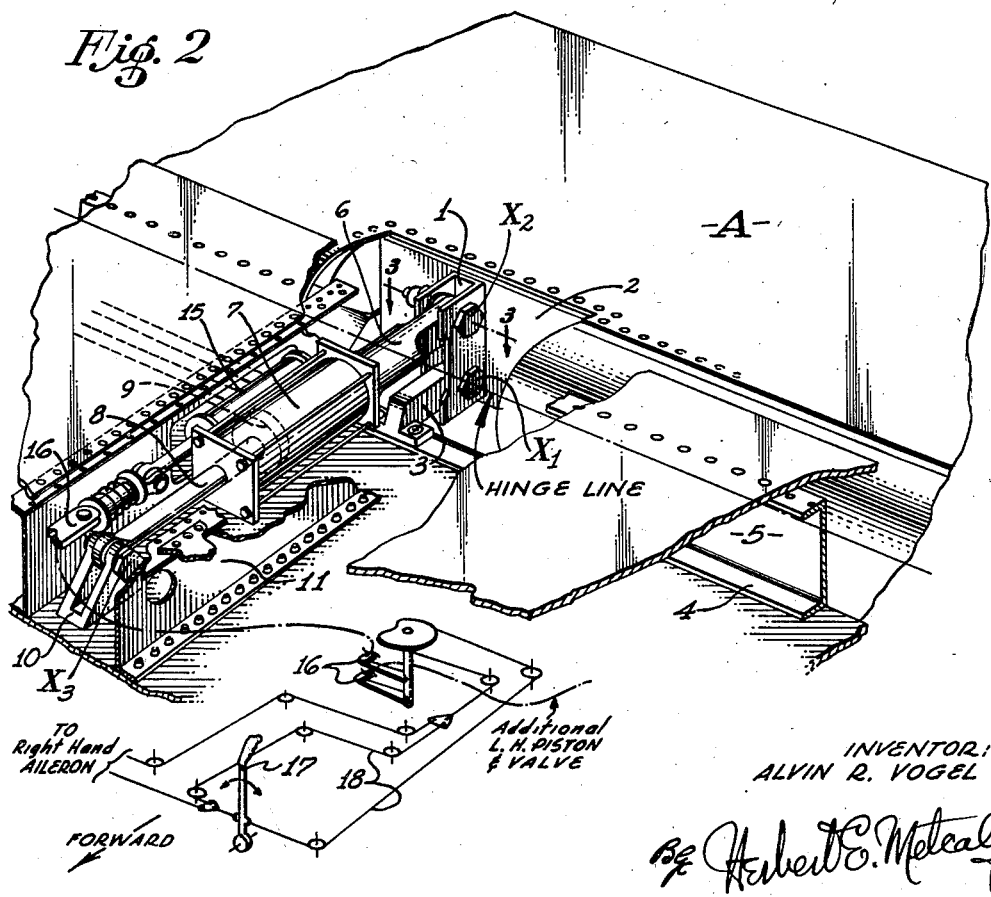
Figure 2 is a perspective view of one aileron hinge and control motor as used in the airplane of Figure 1.

Here, the aileron A is cut away at the hinge points, S, of which several are shown in Figure 1 but only one of which is shown in Figure 2 and an aileron hinge bracket 1 is attached to the forward aileron spar 2. A lower hinge bolt or pin $X_1$ attaches aileron hinge bracket 1 to a wing hinge bracket 3 attached to the lower web 4 of a rear wing spar 5.

An upper bolt or pin $X_2$ is used to attach a cylinder rod 6 to the aileron bracket 1, this rod being solidly attached to a hydraulic cylinder 7 at the head end thereof. Cylinder 7 is provided at the other end thereof with a piston rod 8 attached to piston 9 inside of cylinder 7. The outer end of piston rod 8 is attached to a thrust bracket 10 by bolts $X_3$, this thrust bracket 10 being attached to a thrust frame 11 extending rearwardly to be also attached to rear wing spar 5.

Fixed to one side of cylinder 7 is a valve body 15 in which a valve (not shown) is moved by valve rod 16 connected to a pilot's control stick 17 of the airplane by cables 18. Motion of the stick 17 will cause fluid to be admitted to one side or the other of piston 9 in cylinder 7 to move the aileron A, the moment arm being between the axis of bolt $X_1$ and bolt $X_2$.

All of the bolts $X_1$, $X_2$, and $X_3$ are, in the system shown, subject to high shear loads.

Proper maintenance requires that these bolts must fit freely enough in the bores of the hinge bracket, thrust bracket, and cylinder rod to facilitate ready removal and replacement thereof. Some backlash is therefore necessarily present when ordinary solid bolts or hinge pins are used in these locations due to the requirement that complete replaceability in the field be always possible; tolerances as to fit cannot be held too close. Thus, ordinary solid bolts or pins together with the other similar aileron hinge pins will permit substantial aileron-wing backlash movement at the hinge, and even though the feed-back loop through bracket 1, bolt $X_2$, rod 6, cylinder 7, piston 9, piston rod 8, bolt $X_3$, thrust bracket 10, thrust frame 11, wing hinge bracket 3, and bolt $X_1$ is very short, any substantial backlash in bolts $X_1$, $X_2$, and $X_3$ leads to surface flutter, particularly as the backlash is accumulative in the feedback loop.

Figure 3:
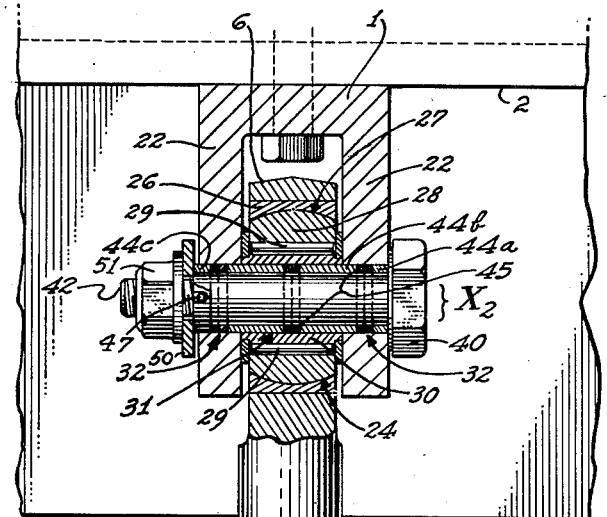
Figure 3 is a view, partly in section and partly in elevation, of one preferred form of the present invention as used in the hinge connecting the aileron motor cylinder to the aileron, taken as indicated by the line 3—3 in Figure 2.
Figure 4:
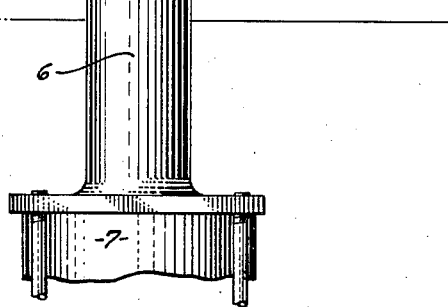
Figure 4 is an exploded perspective view of the parts of the bolt, shown installed in the device of Figure 3.
Figure 4:
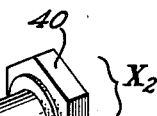
Figure 4:
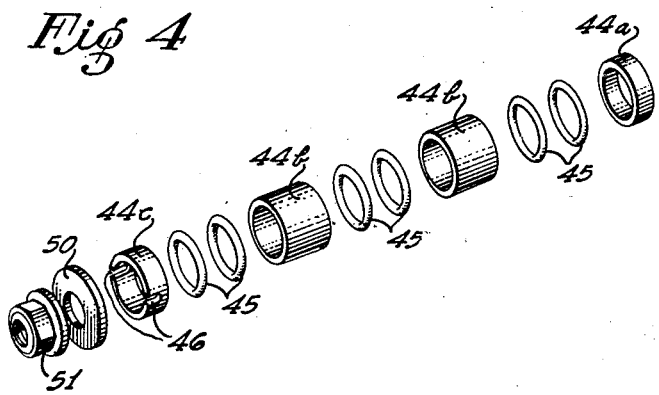
Figure 5:
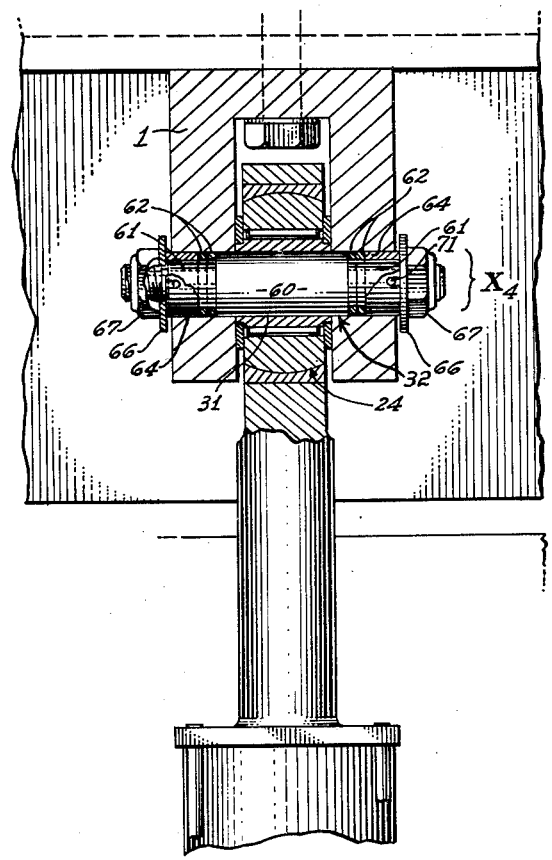
Figure 5 is a view, partly in section and partly in elevation, showing the aileron hinge and aileron motor cylinder of Figure 3, connected by another embodiment of the present invention.

To completely eliminate backlash in bolts $X_1$, $X_2$, and $X_3$ and other aileron hinge bolts not shown, I make all of them as shown particularly in Figures 3, 4, and 5; the particular bolt there illustrated being bolt $X_2$.

Referring next to Figure 3, the aileron bracket 1 is provided with parallel sides 22 in between which is positioned a self-aligning bearing 24. Bearing 24 is press fitted in the end of cylinder rod 6 and comprises an outer frame 26 having an inner spherically contoured surface 27 in which is fitted to rotate, an outer bearing race 28, on the interior of which rollers 29 are positioned; these rollers 29 also bearing on an inner race 30 which has a central bore 31. The two sides 22 of bracket 1 are also provided with coaxial bores 32 which are, within manufacturing tolerances, the same diameter as the inner bore 31 of the inner bearing race 30. In ordinary installations, a solid bolt is passed through the three bores 31, 32—32, and secured to provide the required hinge pin.

As bores 32—32 and bore 31 are not usually exactly the same diameter, and as the bolt forming the hinge pin has to be sufficiently undersized to be readily installed and removed through all three holes 31 and 32—32, backlash in the hinge at the hinge pin will invariably be present to a greater or lesser degree, and will tend to vary in different hinges. It is to be noted that the self-aligning bearing 24 is a precision device and does not, as a rule, have to be demounted when the control surface is removed from the airplane. If this bearing 24 should be the cause of backlash, however, it would be replaced in its entirety. Furthermore, it is found that if the spherical surface 27 between frame 26 and outer race 28 should, in any manner, be initially loose enough to have any backlash, a slight peening of the frame 26 along the bearing line will remove any play in that bearing surface 27. Since any relative movement between frame 26 and outer race 28 is generally due only to misalignment, such movement is always small and is not sufficient to cause significant wear during the normal life of the bearing to cause backlash. In case of appreciable wear between the races 28 and 30 and the rollers 29, the entire bearing will be replaced.

The hinge bolt or pin of the present invention, as particularly shown in Figures 3 and 4, comprises a bolt head 40 and a body shank 41 extending axially therefrom terminating in a threaded end 42 of lesser diameter than shank 41. A plurality of hardened steel sleeves 44a, 44b, and 44c are sized to slide over shank 41, and are preferably separated by pairs of O rings 45 of elastic material such as rubber, for example. In the embodiment shown in Figure 4, short sleeve 44a is placed next to bolt head 40, then a pair of O rings 45, next a longer sleeve 44b, another pair of O rings 45, another long sleeve 44b, a final pair of O rings 45, and a terminal sleeve 44c. Terminal sleeve 44c is provided with a slot 46 which opens toward the threaded end 42 of the body shank 41. The shank 41 adjacent the threaded end is diametrically bored to receive a slot pin 47. Slot pin 47 is inserted, after all the sleeves 44a, 44b, and 44c and O rings 45 have been placed on the shank 41, so that the sleeves 44a, 44b, 44c and O rings 45 are retained on shank 41 by the pin 47 which extends through slot 46 in terminal sleeve 44c.

In dimensioning the widths of the sleeves 44a, 44b, and 44c and the O rings 45, it is preferred that the length of the combined sleeves and O rings, when assembled on shank 41, be slightly greater than the length of shank 41 so that the outer end of terminal sleeve 44c will extend beyond the end of shank 41; pin 47 being bottomed in slot 46. It is important, however, that it be made certain that O rings 45 are not compressed to any appreciable degree.

It is also preferred that the individual sleeve lengths be so proportioned so that when the assembled bolt is inserted in the hinge, a pair of O rings are adjacent and presented to the inner wall of bore 32 in one side 22 of bracket 1; another pair of O rings 45 being adjacent and presented to the inner wall of bore 31 in the inner bearing race 30; and the third pair of O rings 45 being adjacent and presented to the inner wall of bore 32 in the other side 22 of bracket 1, as best shown in Figure 3.

This bolt assembly is then used as the hinge bolt or hinge pin for all the hinges heretofore discussed. The outer diameter of sleeves 44a, 44b, 44c and O rings 45 is maintained at the same diameter as a solid bolt to be used as a hinge pin. Thus the bolt assembly so far described can be inserted in the three holes 32—32 and 31, of any hinge, either in a new installation or as a replacement for a solid bolt that has been previously installed. After the bolt $X_2$ has been inserted through the three bores 32—32 and 31, a washer 50 is slipped over threaded end 42; this washer 50 having an inner hole smaller in diameter than that of the body shank 41. An elastic stop nut 51 is then threaded on threaded end 42 of the bolt $X_2$ to retain the assembly thereon.

As nut 51 is rotated, washer 50 is forced against the end of terminal sleeve 44c which projects beyond the end of body shank 41, to start compression of the O rings 45. As the O rings 45 can only expand laterally of the axis of bolt shank 41, the O ring material is forced inwardly against the body shank 41 and outwardly against the inner walls of bores 32—32 and 31. The rotation of nut 51 on threaded end 42 is continued until washer 50 contacts the outer end of body shank 41, and no further rotation can be made.

When nut 51 is run full-up on the body shank 41 the axial compression of the O rings 45 has laterally forced the material thereof both outwardly and inwardly to the extent that the bolt assembly $X_2$ is completely frozen to the sides 22 of bracket 1, and to the inner race 30 of the self-aligning bearing. No significant backlash is present inasmuch as the elastic material of the O rings 45, being under high compression and confined, acts under these conditions as a non-resilient solid. However, when nut 51 is removed the O rings will return to their original shape sufficiently to permit easy removal of the bolt assembly $X_2$. It has been found that O rings of silicone rubber, for example, age only very slowly when strongly compressed, and will readily return sufficiently close to their original condition (after compression) for all ordinary maintenance periods, so that the hinge bolt assembly can readily be removed.

The bolt assembly of the present invention has other notable advantages over solid bolts. The latter, when used in the type of hinge described, must have the nuts very carefully tightened with torque wrenches or the hinge will bind. The nut in the hinge pin of the present invention tends to tighten against the body shank shoulder and therefore needs no torque wrench. Furthermore, inasmuch as the elastic material of the O rings has a range of compression values where the material deforms farther only under high pressures, the bottoming of nut 51 on shank 41 will cause the O rings to expand laterally only sufficiently to remain backlash-free under all normal manufacturing tolerances between shank 41 and the bores 32—32 and 31. And finally, elastic stop nuts can be safely used, eliminating the necessity of lock wires, extra drilling operations and the work entailed in their installation.

Figure 6:
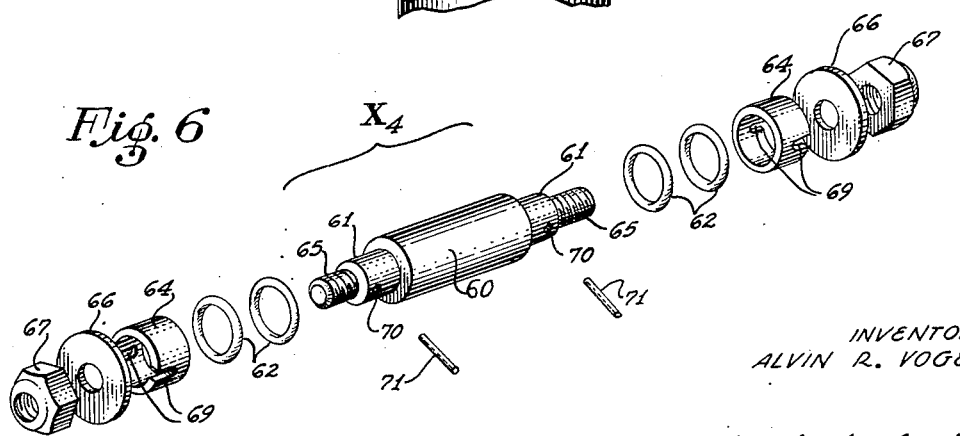
Figure 6 is an exploded perspective view of the parts of the bolt assembly of Figure 5.

In case it is found that manufacturing tolerances can be held within limits where any backlash between the connecting pin $X_4$ and the self-aligning bearing 24 is negligible, my invention can take the form shown in Figures 5 and 6 wherein the diameter of the central shank portion 60 of the pin $X_4$ is sized to provide a minimum clearance fit with the central bore 31 of the bearing 24; this enlarged portion of the shank 60 being disposed between portions 61 of reduced diameters at each end sized to accommodate O rings 62 and sleeves 64. Threaded portions 65 at each extreme end of the pin $X_4$ are of course provided and sized to receive washers 66 and standard elastic stop nuts 67 to complete the assembly. As in the case of the pin $X_2$ of the preceding figures, the sleeves 64 are each provided with a slot 69 opening at the outer ends thereof and the shank is provided with the bores 70 to receive slot pins 71. The lengths of the pin portions 60 and 61 and sleeves 64 are dimensioned so that the O rings 62 are approximately centered in the coaxial bores 32 of the aileron hinge bracket 1; the sleeves 64 extending slightly beyond the reduced portions 61 of the pin $X_4$ so that compression of the O rings 62 can be achieved at each end of the pin $X_4$ in the same manner as applies to the pin $X_2$ described and shown in Figures 3 and 4.

The use of the bolt assemblies herein described, has proved in practice to remove backlash in control surface hinges of high speed aircraft to the extent that flutter dampers and similar devices can be dispensed with if desired. However, it is to be understood that the present invention can also be used as a hinge pin to prevent backlash in any hinge where backlash is troublesome.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A composite anti-backlash bolt for insertion in a bore: which comprises a bolt body, sleeve means generally fitting and slideable over said body, said sleeve means having an outside diameter generally fitting and slidable through said bore, a ring of deformable material around said body and having an outside diameter substantially the same as that of said sleeve means, stop means on said bolt for preventing longitudinal motion of said sleeve means and ring past said stop means, a reduced diameter end on said bolt extending from said bolt body, said sleeve means having a normal static position projecting slightly over said reduced diameter end beyond said body, and force fastening means on said reduced diameter end for forcing said projecting sleeve means back on said body in a direction to deform said ring laterally, said force fastening means being separate from said stop means and of larger diameter than said bore to fasten one end of said bolt in non-removable position within said bore, whereby when said bolt is positioned in said bore with said ring opposed to the wall of said bore, the pressure of said laterally deformed material is exerted simultaneously against said bore wall and said body to freeze said bolt in said bore.

2. In combination with a member having a bore; a composite bolt comprising a bolt body, a plurality of sleeves generally fitting and slideable over said body, said sleeves having an outside diameter generally fitting and slideable through said bore, a ring of elastic material around said body and having an outside diameter substantially the same as that of said sleeves, said ring being positioned between adjacent edges of two of said sleeves; the assembled body, sleeves, and ring being inserted into said bore to the extent that said ring is opposed to the inner wall of said bore, and means attached to said bolt for forcing said two sleeves along said body towards each other to deform the elastic material of said ring laterally to the extent that the lateral expansion of said deformed elastic material simultaneously impinges said inner wall and said body to effectively bind said bolt in said bore while said ring is laterally expanded, said forcing means including abutment means on each end of said bolt larger in diameter than said bore to fasten said bolt in non-removable position within said bore.

3. In combination with a pair of separate members to be hinged together, one of said members having at least one bore therethrough aligned with a bearing bore through the other member; a composite anti-backlash bolt extending through said aligned bores, comprising a bolt body, a plurality of sleeves generally fitting and slideable over said body, said sleeves having an outside diameter generally fitting and slideable through said aligned bores, a plurality of rings of elastic material around said body and having an outside diameter substantially the same as that of said sleeves, said rings being spaced along the extent of said body between adjacent edges of said sleeves to oppose the walls of said aligned bores, and removable means attached to provided on at least one end of said composite bolt for forcing said sleeves along said body toward each other to expand the elastic material of said rings laterally, whereby when said bolt is positioned in said aligned bores with said rings opposed to the walls of said bores, the pressure of said expanded elastic material exerted simultaneously against said bore walls and said body is effective to bind said bolt in said bores while said rings are expanded, and including positive retaining means on said bolt separate from said forcing means, to hold said sleeves and rings uncompressed on said bolt when said forcing means is removed, whereby said bolt body, said sleeves, said rings, and said retaining means are removable in a single sub-assembly from said bores.

4. In combination with a pair of separate members to be hinged together, one of said members having at least one bore therethrough concentrically aligned with a bearing bore through the other member, and one of said members having a bearing element rotatable about the axis of its said bore; a composite anti-backlash hinge bolt extending through said aligned bores, which comprises a bolt having a first body portion thereof sized to a minimum clearance fit with the bore of one of said members, a second, smaller diameter, body portion of said bolt extending concentrically from said first portion, a sleeve generally fitting and slideable over said second body portion, said sleeve having an outside diameter generally fitting and slideable through the bearing bore of said other member, a deformable elastic ring having an outside diameter substantially the same as said sleeve and positioned around said second body portion between said sleeve and said first body portion, said sleeve being dimensioned and spaced so that said ring is opposed to the wall of the bearing bore of said other member, and means for forcing said sleeve toward said first body portion to deform said ring laterally so that said deformed ring simultaneously impinges said bore wall and said bolt body to bind said bolt in said bore while said ring is deformed, and including abutment means fastened to each end of said bolt larger in diameter than said bores and straddling said aligned bores beyond the far ends thereof to hinge said members together about said bolt with said bolt in non-removable position within said bores.

5. In combination with a pair of members to be hinged together, one of said members having a hinge bracket attached thereto including a pair of parallel sides, each of said sides having a bore therethrough coaxially aligned with each other, connecting means attached to the other member to be hinged, and positioned between the sides of hinge bracket and having a bearing bore coaxially aligned with the bores of said sides; a composite anti-backlash bolt extended through the aligned bores of said hinge bracket and said connecting member, which comprises a bolt body, a plurality of sleeves generally fitting and slideable over said body, said sleeves having an outside diameter generally fitting and slideable through said aligned bores, a plurality of deformable elastic rings around said bolt body and having an outside diameter substantially the same as said sleeves, and spaced along the extent of said body between adjacent edges of said sleeves so as to oppose the walls of said aligned bores, compression means attached to said composite bolt for forcing said sleeves along said body toward each other to deform said elastic rings laterally so that the lateral expansion of said deformed rings simultaneously impinges the wall of said bores and said bolt body to bind said composite bolt in said aligned bores while said rings are deformed, and means on the ends of said bolt for securing said bolt against appreciable longitudinal motion out of said bores.

6. In combination with a pair of members to be hinged together, one of said members having at least one bore therethrough in alignment with a bearing bore through the other member; a composite anti-backlash bolt extending through said aligned bores comprising a bolt having a head at one end thereof, said head having a greater diameter than said bores, a plurality of sleeves generally fitting and slideable over said bolt, said sleeves having an outside diameter generally fitting and slideable through said aligned bores, a plurality of elastic rings around said bolt and having an outside diameter substantially the same as that of said sleeves, said rings being spaced along the extent of said bolt between adjacent edges of said sleeves to oppose the walls of said aligned bores, the length of said composite bolt being such that when said bolt is extended through said aligned bores with said head bottomed against the outer side of one of said members, the sleeve at the end of said body opposite said head end will project out of the bore at the outer side of said other member and slightly beyond the body of said bolt, said bolt having a threaded portion extending coaxially from the body of said bolt at the end thereof opposite said head end, said threaded portion having a major diameter smaller than the diameter of said bolt, a washer having a greater outside diameter than said bore and an inner hole generally fitting and slideable over said threaded portion, a nut threaded onto said threaded portion, said nut being threadable inwardly on said threaded portion to urge said washer inwardly against said projecting sleeve to force all of said sleeves toward each other to compress said elastic rings, said compressed rings expanding laterally to simultaneously impinge the walls of said aligned bores and the periphery of said bolt to effectively bind said composite bolt in said aligned bores as long as said rings are expanded, and means in addition to said washer and nut for retaining said sleeves and rings on said bolt body.

7. Apparatus in accordance with claim 6 wherein said additional means for retaining said sleeves and rings on said bolt includes a slot extending lengthwise in said projecting end sleeve and open only at the outer end thereof, a transverse bore in said bolt and aligned with said slot in said sleeve, and a pin extended through said slot and said bore, whereby when said sleeves are free of compression, said pin is bottomed against the closed end of said slot to retain said sleeves and rings on said bolt.

8. In combination with a pair of members to be hinged together, one of said members having at least one bore therethrough in alignment with a bearing bore through the other member; a composite anti-backlash bolt extending through said aligned bores comprising a bolt having a head at one end thereof, said head having a greater diameter than said bores, a plurality of sleeves generally fitting and slideable over said bolt, said sleeves having an outside diameter generally fitting and slideable through said aligned bores, a plurality of elastic rings around said bolt and having an outside diameter substantially the same as that of said sleeves, said rings being spaced along the extent of said bolt between adjacent edges of said sleeves to oppose the walls of said aligned bores, the length of said composite bolt being such that when said bolt is extended through said aligned bores with said head bottomed against the outer side of one of said members, the sleeve at the end of said body opposite said head end will project out of the bore at the outer side of said other member and slightly beyond the body of said bolt, said bolt having a threaded portion extending coaxially from the body of said bolt at the end thereof opposite said head end, said threaded portion having a major diameter smaller than the diameter of said bolt, a washer having a greater outside diameter than said bore and an inner hole generally fitting and slideable over said threaded portion, a nut threaded onto said threaded portion, said nut being threadable inwardly on said threaded portion to urge said washer inwardly against said projecting sleeve to force all of said sleeves toward each other to compress said elastic rings, said compressed rings expanding laterally to simultaneously impinge the walls of said aligned bores and the periphery of said bolt to effectively bind said composite bolt in said aligned bores as long as said rings are expanded.

References Cited in the file of this patent

UNITED STATES PATENTS

| | | |
|---|---|---|
| 1,175,081 | Petrich | Mar. 14, 1916 |
| 1,752,312 | Turnquist | Apr. 1, 1930 |
| 1,811,334 | Roemer | June 23, 1931 |
| 2,068,720 | Vincent | Jan. 26, 1937 |
| 2,132,182 | Nixon | Oct. 4, 1938 |
| 2,468,511 | Pilch | Apr. 26, 1949 |